(12) United States Patent
Park et al.

(10) Patent No.: US 11,161,731 B2
(45) Date of Patent: Nov. 2, 2021

(54) DEVICE FOR OPENING AND CLOSING UREA INLET FOR VEHICLE

(71) Applicants: HYUNDAI MOTOR COMPANY, Seoul (KR); KIA MOTORS CORPORATION, Seoul (KR)

(72) Inventors: June Young Park, Hwaseong-si (KR); Jun Sik Lim, Bucheon-si (KR); Tae Yoon Lee, Seoul (KR); Sung Won Lee, Hwaseong-si (KR); Seung Hoon Choi, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/660,095

(22) Filed: Oct. 22, 2019

(65) Prior Publication Data
US 2020/0339409 A1    Oct. 29, 2020

(30) Foreign Application Priority Data
Apr. 29, 2019    (KR) .................. 10-2019-0050005

(51) Int. Cl.
*B67D 7/06*    (2010.01)
*B60K 13/04*    (2006.01)
*F01N 3/20*    (2006.01)

(52) U.S. Cl.
CPC ............. *B67D 7/06* (2013.01); *B60K 13/04* (2013.01); *F01N 3/2066* (2013.01); *B67D 2210/00144* (2013.01); *F01N 2610/02* (2013.01); *F01N 2610/142* (2013.01); *F01N 2610/1413* (2013.01); *F01N 2610/1466* (2013.01)

(58) Field of Classification Search
CPC ............ B67D 7/06; B67D 2210/00144; F01N 3/2066; F01N 2610/1466; F01N 2610/1413; F01N 2610/142; F01N 2610/02; B60K 13/04
USPC ......................................... 141/360
See application file for complete search history.

(56) References Cited

U.S. PATENT DOCUMENTS

| 2,672,257 | A | * | 3/1954 | Simmonds | B65D 55/16 |
| | | | | | 220/230 |
| 2,758,743 | A | * | 8/1956 | Smith | B60K 15/0406 |
| | | | | | 220/293 |
| 2,802,592 | A | * | 8/1957 | Clifton | B60K 15/0406 |
| | | | | | 220/293 |
| 3,181,895 | A | * | 5/1965 | Cator | F16L 37/004 |
| | | | | | 285/1 |
| 4,706,834 | A | * | 11/1987 | Farney | F16L 55/10 |
| | | | | | 206/818 |

(Continued)

FOREIGN PATENT DOCUMENTS

| CN | 203780485 U | 8/2014 |
| JP | 2011-207471 A | 10/2011 |

(Continued)

*Primary Examiner* — Timothy L Maust
*Assistant Examiner* — James R Hakomaki
(74) *Attorney, Agent, or Firm* — Morgan, Lewis & Bockius LLP

(57) ABSTRACT

A device for opening and closing a urea inlet for a vehicle is configured to close an inlet of a urea filler neck in a push manner and to open the same in a pull manner, preventing a user from touching the vehicle body or peripheral portions when opening and closing the inlet.

12 Claims, 6 Drawing Sheets

(56) References Cited

U.S. PATENT DOCUMENTS

| | | | | |
|---|---|---|---|---|
| 5,624,410 | A * | 4/1997 | Tsukada | A61M 39/20 604/256 |
| 5,817,067 | A * | 10/1998 | Tsukada | A61F 2/0018 604/256 |
| 6,036,061 | A * | 3/2000 | O'Donnell | B65D 47/061 215/276 |
| 6,382,450 | B1 * | 5/2002 | De Rosa | B65D 41/02 206/818 |
| 7,172,101 | B2 * | 2/2007 | Find | A47J 41/0005 220/230 |
| 8,210,572 | B2 * | 7/2012 | Davis | H01F 7/0252 285/9.1 |
| 8,235,078 | B2 * | 8/2012 | Horlacher | B60K 15/04 141/350 |
| 9,093,206 | B2 * | 7/2015 | Davis | H01F 7/0252 |
| 9,096,124 | B2 * | 8/2015 | Whelan | B60K 15/035 |
| 9,469,520 | B2 * | 10/2016 | Schulze | B67D 7/42 |
| 9,803,787 | B2 * | 10/2017 | Scott | F16L 37/004 |
| 10,421,354 | B2 * | 9/2019 | Radu | F01N 3/2066 |
| 2003/0094455 | A1 * | 5/2003 | Pozgainer | B60K 15/0406 220/304 |
| 2009/0145903 | A1 * | 6/2009 | Soltis | B60K 15/0406 220/288 |
| 2010/0200115 | A1 * | 8/2010 | Santinon | F01N 3/2066 141/390 |
| 2010/0308605 | A1 * | 12/2010 | Fiedler | A45C 13/1084 292/251.5 |
| 2011/0100985 | A1 * | 5/2011 | Tsiberidis | B60K 13/04 220/86.2 |
| 2013/0248048 | A1 * | 9/2013 | Behnamrad | B60K 15/04 141/311 R |
| 2013/0291825 | A1 | 11/2013 | Sloan et al. | |
| 2013/0306665 | A1 * | 11/2013 | Eberhardt | B60K 15/035 220/746 |
| 2014/0367390 | A1 * | 12/2014 | Horlacher | B60K 15/03006 220/562 |
| 2016/0003122 | A1 * | 1/2016 | Ham | B60K 13/04 60/295 |
| 2016/0263991 | A1 * | 9/2016 | Koukan | F01N 3/2066 |
| 2017/0106742 | A1 * | 4/2017 | D'Amoto | B60K 15/013 |
| 2017/0355589 | A1 * | 12/2017 | Kim | B60K 15/03 |
| 2018/0244149 | A1 * | 8/2018 | Fiore | F01N 3/2896 |
| 2018/0370786 | A1 * | 12/2018 | Zitkovic, Jr. | B60K 15/0406 |
| 2019/0225391 | A1 * | 7/2019 | Stone | B01D 53/9431 |

FOREIGN PATENT DOCUMENTS

| | | |
|---|---|---|
| KR | 10-0435951 B1 | 6/2004 |
| KR | 10-0448119 B1 | 9/2004 |
| KR | 10-2006-0065161 A | 6/2006 |
| KR | 10-2017-0143099 A | 12/2017 |

* cited by examiner

DEVICE FOR OPENING AND CLOSING UREA INLET FOR VEHICLE

CROSS-REFERENCE TO RELATED APPLICATION

The present application claims priority to Korean Patent Application No. 10-2019-0050005 filed on Apr. 29, 2019, the entire contents of which is incorporated herein for all purposes by this reference.

BACKGROUND OF THE PRESENT INVENTION

Field of the Invention

The present invention relates to a device for opening and closing a urea inlet for a vehicle. More particularly, it relates to a device for conveniently opening and closing a urea inlet of a urea filler neck without interfering with peripheral parts.

Description of Related Art

In general, a diesel engine vehicle is provided with a urea system to purify emissions. The urea system supplies urea to a catalytic converter of an engine exhaust system, and the urea supplied to the catalytic converter reacts to nitrogen oxide (NOx) present in the emissions to reduce the nitrogen oxide to nitrogen and water.

The urea system may include a urea tank for storing urea, a urea filler neck connected to the urea tank for the urea to flow to the urea tank, and a urea cap for opening and closing an inlet of the urea filler neck.

The conventional urea cap is provided with an air-permeable membrane to eliminate positive pressure and negative pressure that are generated in the urea tank when the urea is discharged from the urea tank or when the urea is collected in the urea tank. The urea cap is formed in a thread type to be screwed into the inlet of the urea filler neck. The membrane closes the inlet of the urea filler neck at normal times (when urea is not being injected). Thus, when a user intends to inject urea into the urea tank, the user needs to rotate the urea cap to remove the urea cap from the inlet of the urea filler neck.

The urea cap 1 described above is mounted in the internal space of a fuel door (i.e., a fuel cap chamber) together with a fuel cap 2. The fuel door is usually designed to be small in consideration of the design of the vehicle, and accordingly the fuel cap chamber S is also formed to be small (refer to FIG. 9).

Thus, when the user rotates the urea cap 1 to open or close the inlet of the urea filler neck, the user's hand may touch the peripheral portion of the vehicle body, the fuel cap 2, the door hook, or the like. Accordingly, it is inconvenient for the user to operate the urea cap 1 to open or close the inlet of the urea filler neck, which results in user complaints and decreased marketability.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a device for opening and closing a urea inlet for a vehicle, which is configured to close an inlet of a urea filler neck in a push manner and to open the same in a pull manner, preventing a user from touching the vehicle body or peripheral portions when opening and closing the inlet.

Various aspects of the present invention are directed to providing a device configured for opening and closing a urea inlet for a vehicle, the device including a urea filler neck having an inlet to inject urea into a urea tank, a cap body configured to be mounted to an upper portion of the urea filler neck to close the inlet, a body-fixing portion mounted at a lower side of the cap body, wherein the body-fixing portion is configured to be inserted into the upper portion of the urea filler neck when the cap body is operated to close the inlet, and a metal member mounted in the body-fixing portion, wherein the metal member is fixed in the state of being inserted into or mounted to the upper portion of the urea filler neck by a magnetic-force-generating member mounted in the urea filler neck when the body-fixing portion is inserted into the upper portion of the urea filler neck.

In an exemplary embodiment of the present invention, the magnetic-force-generating member may be mounted in the urea filler neck while being spaced in a predetermined distance apart from the inlet into the urea filler neck, and the metal member may be mounted above the magnetic-force-generating member and may be attracted downwards by a magnetic force generated by the magnetic-force-generating member when the body-fixing portion is inserted into the upper portion of the urea filler neck through the inlet. The magnetic-force-generating member may be mounted in the circumferential direction of the urea filler neck, and the metal member may be mounted in the circumferential direction of the body-fixing portion.

In another exemplary embodiment of the present invention, the cap body may include a body cover portion formed on the upper end portion of the body-fixing portion, and the body cover portion may cover the inlet when the body-fixing portion is inserted into the upper portion of the urea filler neck. The cap body may further include a seal member secured to a lower surface of the body cover portion, and when the body-fixing portion is inserted into the upper portion of the urea filler neck, the seal member may be brought into close contact with the upper end portion of an injection portion of the urea filler neck in which the inlet is formed. The seal member may be pressed toward the upper end portion of the injection portion by magnetic force of the magnetic-force-generating member attracting the metal member. The body cover portion may have a ventilation hole formed therein to allow air to pass therethrough, and the ventilation hole may be formed outside the body-fixing portion. The body cover portion may be provided with a membrane configured to cover the ventilation hole and to allow only air to pass therethrough. The body cover portion may have a larger radius than a radius of the inlet, and the body-fixing portion may have a smaller radius than the radius of the inlet.

In yet another exemplary embodiment of the present invention, the device may further include a cap head provided at an upper end portion thereof with a grip portion configured to be grasped by a user. When the body-fixing portion is inserted into the upper portion of the urea filler neck, the grip portion may be moved downwards linearly from above the inlet, and when the body-fixing portion is drawn out of the upper portion of the urea filler neck, the grip portion may be moved upwards linearly above the inlet.

In yet another exemplary embodiment of the present invention, the cap head may be coupled to an upper portion of the cap body. The cap head may have a plurality of fixing protrusions formed on the internal surface of the cap head while being spaced from each other in the circumferential direction of the cap head, and the cap body may have a body-coupling portion formed at an upper portion of the cap body. When the body-coupling portion is inserted into the cap head and is caught by the fixing protrusions, air may pass between the fixing protrusions.

In still yet another exemplary embodiment of the present invention, the magnetic-force-generating member may drive a urea-injecting gun to supply urea when the urea-injecting gun is inserted into the upper portion of the urea filler neck.

Other aspects and exemplary embodiments of the present invention are discussed infra.

It is understood that the term "vehicle" or "vehicular" or other similar term as used herein is inclusive of motor vehicles in general such as passenger vehicles including sports utility vehicles (SUV), buses, trucks, various commercial vehicles, watercraft including a variety of boats and ships, aircraft, and the like, and may include hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

The above and other features of the present invention are discussed infra.

Figure 1:
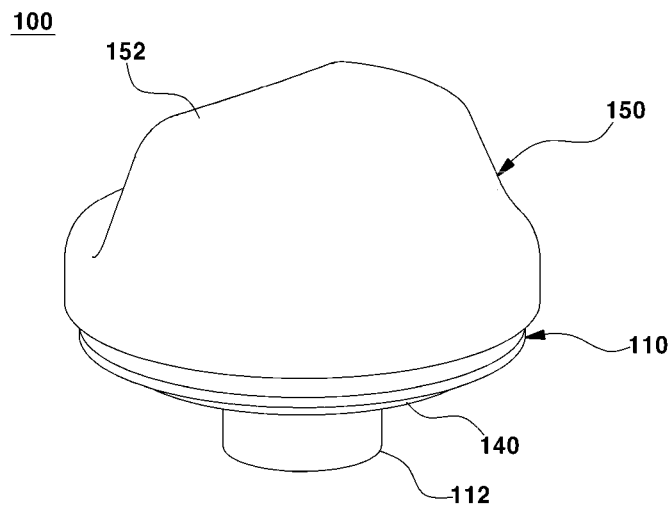
FIG. 1 is a coupled perspective view of a urea cap according to an exemplary embodiment of the present invention.

It may be understood that the appended drawings are not necessarily to scale, presenting a somewhat simplified representation of various exemplary features illustrative of the basic principles of the present invention. The specific design features of the present invention as included herein, including, for example, specific dimensions, orientations, locations, and shapes, will be determined in portion by the particular intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

A urea cap for a vehicle according to an exemplary embodiment of the present invention is a device configured for opening and closing an inlet of a urea filler neck for urea injection, and is configured to close the inlet of the urea filler neck in a push manner and to open the same in a pull manner, preventing the user from touching the vehicle body or peripheral portions when opening and closing the inlet.

As illustrated in FIG. 1, FIG. 2, FIG. 3, and FIG. 4, the urea cap 100 includes a cap body 110, which is removably mounted to an upper portion of a urea filler neck 200, and a cap head 150, which is coupled to an upper portion of the cap body 110 to cover the internal space of the cap body 110.

Figure 5:
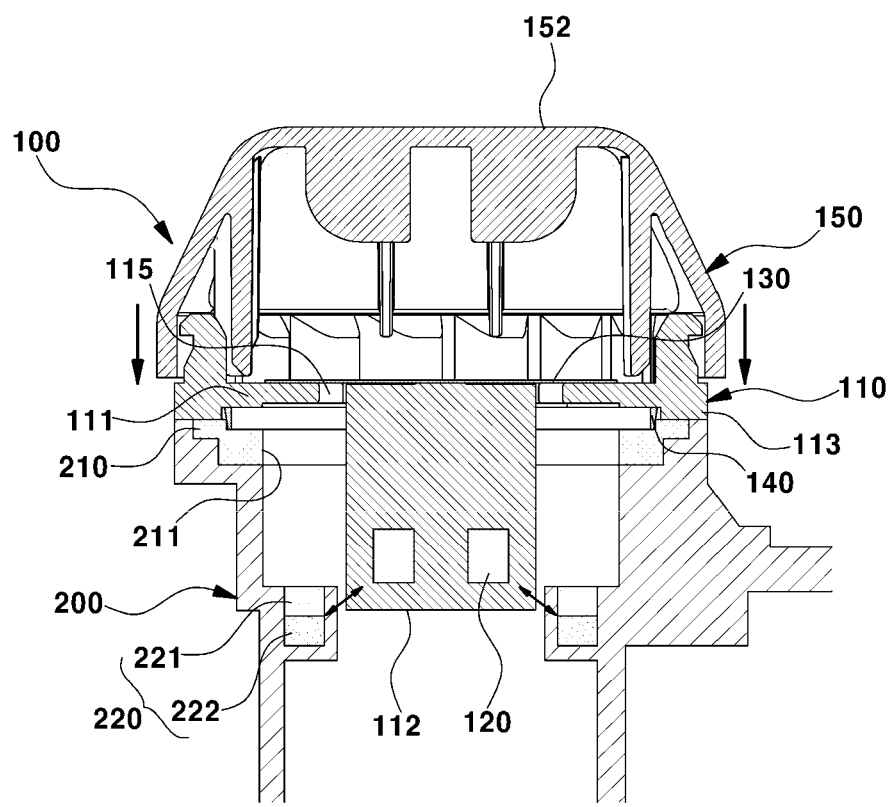
FIG. 5 is a view showing the state in which the urea cap according to an exemplary embodiment of the present invention is inserted into a urea filler neck.
Figure 6:
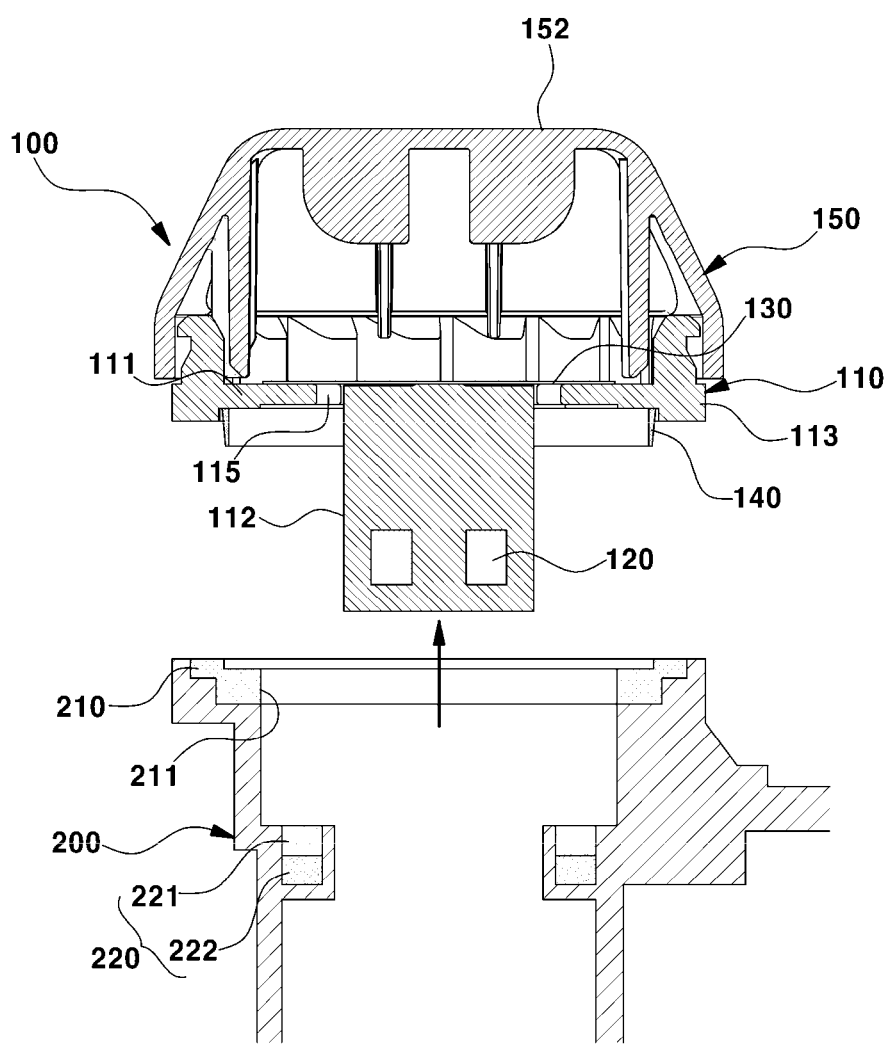
FIG. 6 is a view showing the state in which the urea cap according to an exemplary embodiment of the present invention is removed from the urea filler neck.

As illustrated in FIG. 5 and FIG. 6, an inlet 211 is provided at the upper end portion of the urea filler neck 200, which is connected to a urea tank, and is used to inject urea into the urea tank. An injection portion 210 may be mounted to the upper end portion of the urea filler neck 200, and the inlet 211 may be formed in the injection portion 210. The injection portion 210 may be formed in the shape of a plate having a predetermined thickness.

A magnetic-force-generating member 220 is mounted in the urea filler neck 200. The magnetic-force-generating member 220 is provided to drive a urea-injecting gun 300 when a urea-discharge portion 301 of the urea-injecting gun 300 is inserted into the inlet 211 to spray and supply urea (refer to FIG. 8).

Figure 8:
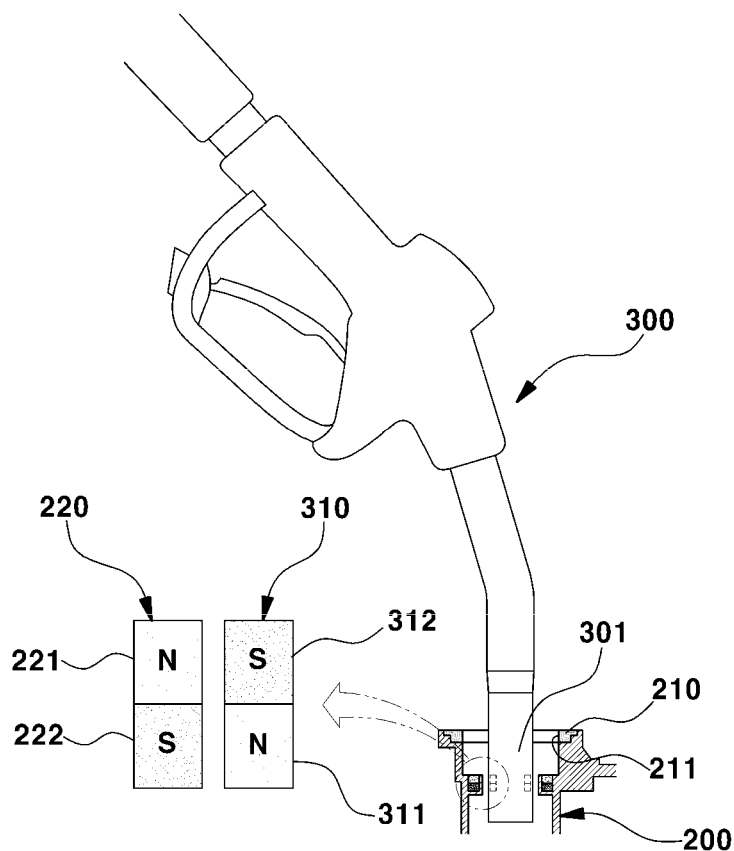
FIG. 8 is a view showing the correspondence between a magnet portion of a urea-injecting gun and a magnetic-force-generating member of the urea filler neck.
Figure 9:
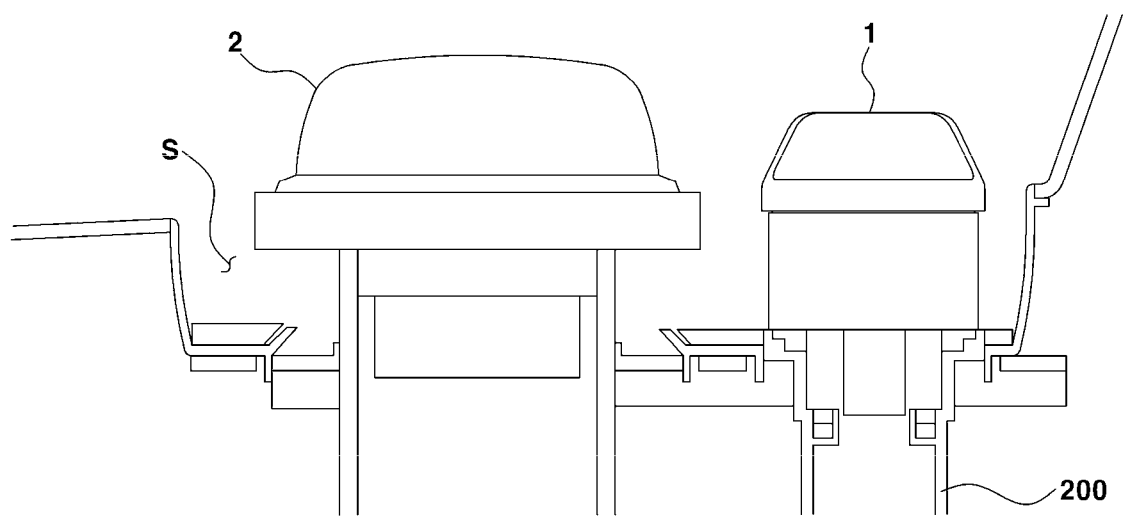
FIG. 9 is a view showing a conventional urea cap and a fuel cap mounted in a fuel cap chamber.

As illustrated in FIG. 8, the magnetic-force-generating member 220 includes a first magnet portion 221 having a first polarity and a second magnet portion 222 having a second polarity which is different from the first polarity. An injecting-gun magnet portion 310, which corresponds to the magnetic-force-generating member 220, is mounted in the urea-injecting gun 300. The injecting-gun magnet portion 310 includes a first injecting-gun magnet portion 311 having a first polarity and a second injecting-gun magnet portion 312 having a second polarity. The first injecting-gun magnet portion 311 has the same polarity as the first magnet portion 221, and the second injecting-gun magnet portion 312 has the same polarity as the second magnet portion 222. When the urea-injecting gun 300 is inserted into the inlet 211 such that the magnetic-force-generating member 220 and the injecting-gun magnet portion 310 generate attractive force therebetween due to the polarities thereof, the urea-injection gun 300 is driven to spray urea. In other words, when the first injecting-gun magnet portion 311 is mounted inside the second magnet portion 222 and the second injecting-gun magnet portion 312 is mounted inside the first magnet portion 221, the urea-injecting gun 300 supplies urea into the urea filler neck 200.

Figure 3:
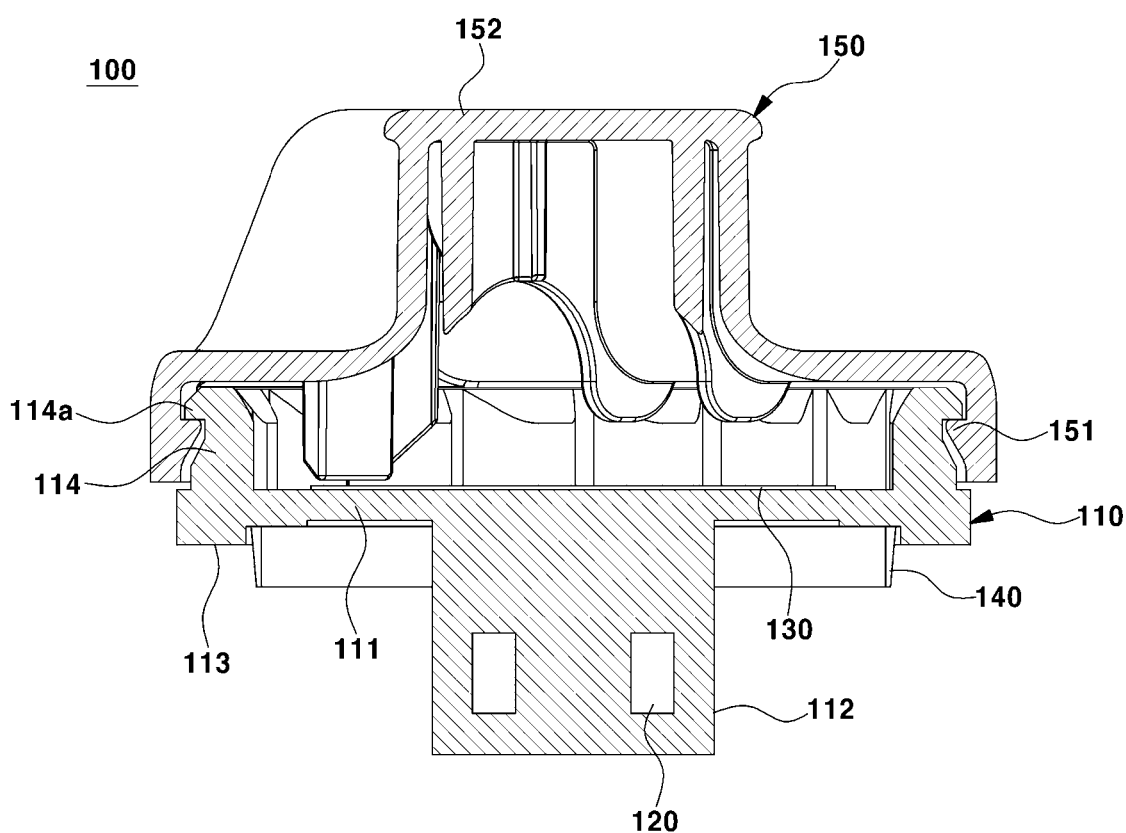
FIG. 3 is a cross-sectional view of the urea cap according to an exemplary embodiment of the present invention.
Figure 4:
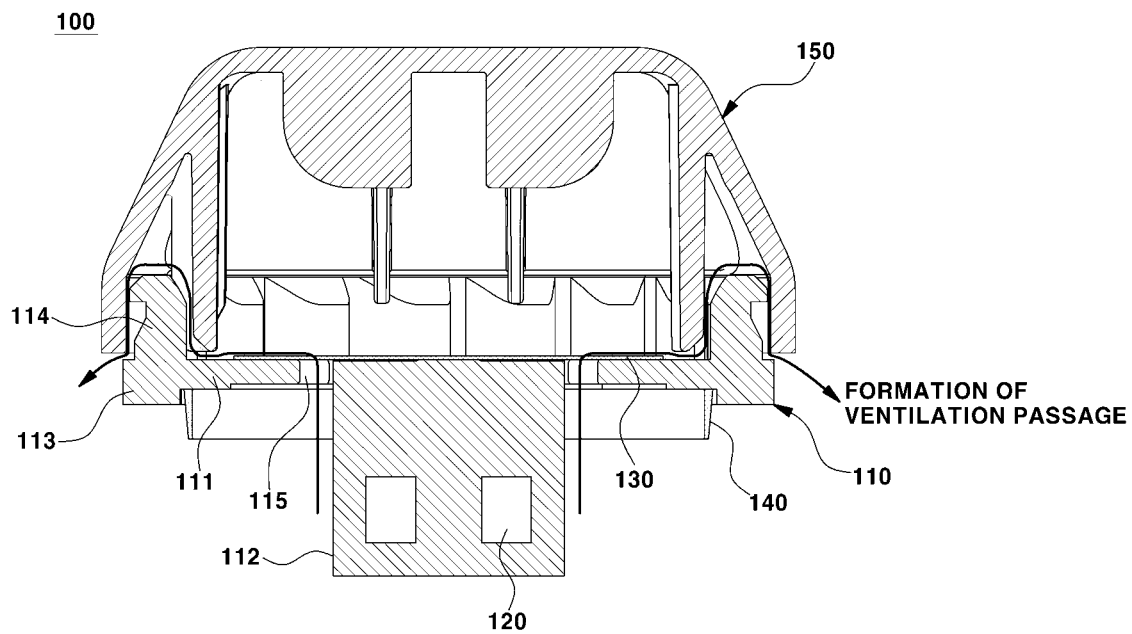
FIG. 4 is a view showing a passage along which air passes through a membrane, which is indicated by arrows.

Referring to FIG. 3, FIG. 4, and FIG. 5, the cap body 110 is configured to close the inlet 211 when the cap body 110 is mounted to the upper portion of the urea filler neck 200. The cap body 110 may include a body cover portion 111, a body-fixing portion 112, and a body-coupling portion 114. The cap body 110 may be formed such that the body cover portion 111, the body-fixing portion 112 and the body-coupling portion 114 are formed integrally through injection molding.

The body cover portion 111 forms a central portion of the cap body 110. The body cover portion 111 may be formed in a flat plate structure that covers the inlet 211 when placed on the inlet 211. The body cover portion 111 is formed on the upper end portion of the body-fixing portion 112 to cover the inlet 211 when the body-fixing portion 112 is inserted into the upper portion of the urea filler neck 200 through the inlet 211.

The body-fixing portion 112 forms a lower portion of the cap body 110. The body-fixing portion 112 protrudes from the body cover portion 111 to be mounted below the body cover portion 111. When the cap body 110 closes the inlet 211, the body-fixing portion 112 penetrates the inlet 211 vertically and is inserted into the upper portion of the urea filler neck 200. The body-fixing portion 112 may be formed in the shape of a cylinder having a predetermined height.

A metal member 120 may be mounted in the body-fixing portion 112. The metal member 120 is formed of a material which is attracted to the magnetic-force-generating member 220 by the magnetic force of the magnetic-force-generating member 220. For example, the metal member 120 may be formed of steel or the like.

The metal member 120 may be integrally molded with the body-fixing portion 112 to be mounted in the body-fixing portion 112 through double injection molding. The metal member 120 may be mounted in the body-fixing portion 112 while being spaced in a predetermined distance apart from the external circumferential surface of the body-fixing portion 112 in the radial direction of the body-fixing portion 112. The metal member 120 may be mounted in the circumferential direction of the body-fixing portion 112. For example, the metal member 120 may be formed in an annular shape.

The metal member 120 may be fixedly inserted into the urea filler neck 200 by the magnetic-force-generating member 220. The metal member 120 may be maintained in the state of being inserted into the upper portion of the urea filler neck 200 through the inlet 211 by the magnetic force generated by the magnetic-force-generating member 220. Since the metal member 120 is attracted toward the magnetic-force-generating member 220, the body-fixing portion 112 may be fixed in the state of being inserted into the upper portion of the urea filler neck 200.

In other words, when the body-fixing portion 112 is inserted into the urea filler neck 200 and the metal member 120 is located at the position to which the magnetic force (i.e., the attractive force) of the magnetic-force-generating member 220 is applied, the body-fixing portion 112 is fixed in the state of being inserted into the urea filler neck 200 by the attractive force applied to the metal member 120. When the body-fixing portion 112 is inserted into the upper portion of the urea filler neck 200 through the inlet 211, the metal member 120, which is mounted above the magnetic-force-generating member 220, is attracted in the downward direction of the urea filler neck 200 by the magnetic force generated by the magnetic-force-generating member 220.

Here, the magnetic-force-generating member 220 may be mounted in the urea filler neck 200 while being spaced in a predetermined distance apart from the inlet into the urea filler neck 211 in the direction in which the body-fixing portion 112 is inserted into the inlet 211 in accordance with the distance between the body-fixing portion 112 and the metal member 120. That is, the magnetic-force-generating member 220 may be mounted below the inlet 211 at a predetermined distance from the inlet 211. The magnetic-force-generating member 220 may be mounted in the circumferential direction of the urea filler neck 200.

As illustrated in FIGS. 2 to 6, a seal member 140 is mounted on the lower surface of the body cover portion 111. The seal member 140 may be formed in the shape of a ring having a predetermined width in the direction in which the body-fixing portion 112 is inserted. The seal member 140 may be mounted in the circumferential direction of the body cover portion 111. The seal member 140 may be attached to the lower surface of the body cover portion 111. The seal member 140 may be integrally formed on the lower surface of the body cover portion 111 through double injection molding.

When the body-fixing portion 112 is inserted into the upper portion of the urea filler neck 200 through the inlet 211 and the body cover portion 111 is placed on the upper end portion of the injection portion 210 having therein the inlet 211, the seal member 140 may be maintained in close contact with the upper end portion of the injection portion 210. The seal member 140 may be compressed when brought into close contact with the upper end portion of the injection portion 210. The seal member 140 is pressed toward the injection portion 210 and is compressed by the force of the magnetic-force-generating member 220 attracting the metal member 120, and a gap between the body cover portion 111 and the injection portion 210 is eliminated, and the airtightness therebetween is maintained by the seal member 140.

The seal member 140 may be mounted inside a body-seating portion 113, which is formed at the edge portion of the body cover portion 111. The body-seating portion 113 may be formed to protrude further downwards than the lower surface of the body cover portion 111. When the seal member 140 is brought into close contact with the upper end portion of the injection portion 210, the body-seating portion 113 may come into contact with the upper end portion of the injection portion 210. To the present end, the upper end portion of the injection portion 210 may be formed in a stepped shape.

When the urea in the urea tank is supplied to the engine exhaust system by the urea pump, negative pressure is generated in the urea tank, and when the urea is collected from the engine exhaust system to the urea tank, positive pressure is generated in the urea tank. To eliminate the negative pressure and the positive pressure in the urea tank even when the inlet 211 is in a closed state, the urea cap 100 has a ventilation structure that allows the air discharged from the urea tank to pass through the inlet 211 and allows air to flow into the urea tank through the inlet 211.

Figure 2:
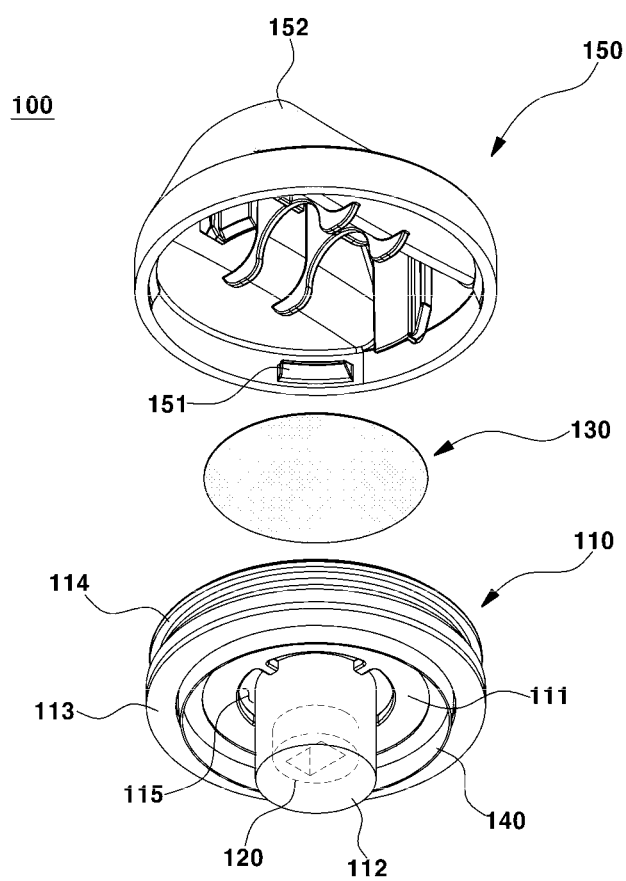
FIG. 2 is an exploded perspective view of the urea cap according to an exemplary embodiment of the present invention.

To secure the ventilation structure, as illustrated in FIGS. 2 and 4, the body cover portion 111 has a ventilation hole 115 formed therein to allow air to pass therethrough. The ventilation hole 115 may be mounted outside the upper portion of the body-fixing portion 112. One or two or more ventilation holes 115 may be formed in the body cover portion 111. In the case in which two or more ventilation holes 115 are formed in the body cover portion 111, the ventilation holes 115 may be spaced from each other in the circumferential direction of the body-fixing portion 112.

A membrane 130 for ventilation is mounted on the upper surface of the body cover portion 111 to prevent the introduction of foreign substances through the ventilation hole 115. The membrane 130 may be formed in the shape of a thin film that filters foreign substances and allows only air to pass therethrough. The membrane 130 covers the ventilation hole 115 and allows only air to pass therethrough.

The body-fixing portion 112 is formed to have a smaller radius than the radius of the inlet 211 to allow air which is discharged from the urea filler neck 200 and air which is introduced into the urea filler neck 200 to pass through the ventilation hole 115. When the body cover portion 111 covers the inlet 211, the ventilation hole 115 may be mounted above the inlet 211. The radius of the body cover portion 111 is greater than the radius of the inlet 211 by a predetermined value or greater.

As illustrated in FIG. 2 and FIG. 3, the body-coupling portion 114 is the portion which is formed in a hook shape at the upper portion of the cap body 110 to be coupled to the cap head 150. The body-coupling portion 114 may be integrally formed with the upper portion of the body-seating portion 113, and may be mounted outside the body cover portion 111. A plurality of fixing protrusions 151 is formed on the internal wall surface of the cap head 150, and the body-coupling portion 114 is provided at the upper end portion thereof with a locking flange 114a, which is caught by the fixing protrusions 151. The body-coupling portion 114 is mounted in the circumferential direction of the body cover portion 111 and defines the internal space of the cap body 110 on the body cover portion 111. When the body-coupling portion 114 is inserted into the cap head 150, the locking flange 114a is pushed and compressed by the fixing protrusions 151, and thereafter is restored and caught by the upper end portions of the fixing protrusions 151.

To secure the ventilation structure between the cap body 110 and the cap head 150 while maintaining the coupling between the cap body 110 and the cap head 150, the fixing protrusions 151 are formed on the internal wall surface of the cap head 150 while being spaced from each other in the circumferential direction of the cap head 150. Accordingly, when the upper portion of the cap body 110 is coupled to the cap head 150, a passage through which air passes is formed between the cap body 110 and the cap head 150 (refer to FIG. 4). That is, when the upper portion of the cap body 110 is coupled to the cap head 150, air passes through a space formed between the fixing protrusions 151 mounted in the circumferential direction of the cap head 150.

As illustrated in FIGS. 1 to 6, the cap head 150 is provided at the upper end portion thereof with a grip portion 152 protruding upwards to allow the user to grasp the same. The user may insert the body-fixing portion 112 into the upper portion (the portion in which the inlet is formed) of the urea filler neck 200 by pushing the grip portion 152 in the vertical direction thereof, or may draw the body-fixing portion 112 out of the upper portion of the urea filler neck 200 by pulling the grip portion 152 in the vertical direction thereof. That is, when the body-fixing portion 112 is inserted into the upper portion of the urea filler neck 200, the grip portion 152 is pushed from above the inlet 211 toward the inlet 211 and is moved downwards linearly. When the body-fixing portion 112 is drawn out of the upper portion of the urea filler neck 200, the grip portion 152 is pulled above the inlet 211 and is moved upwards linearly.

Figure 7:
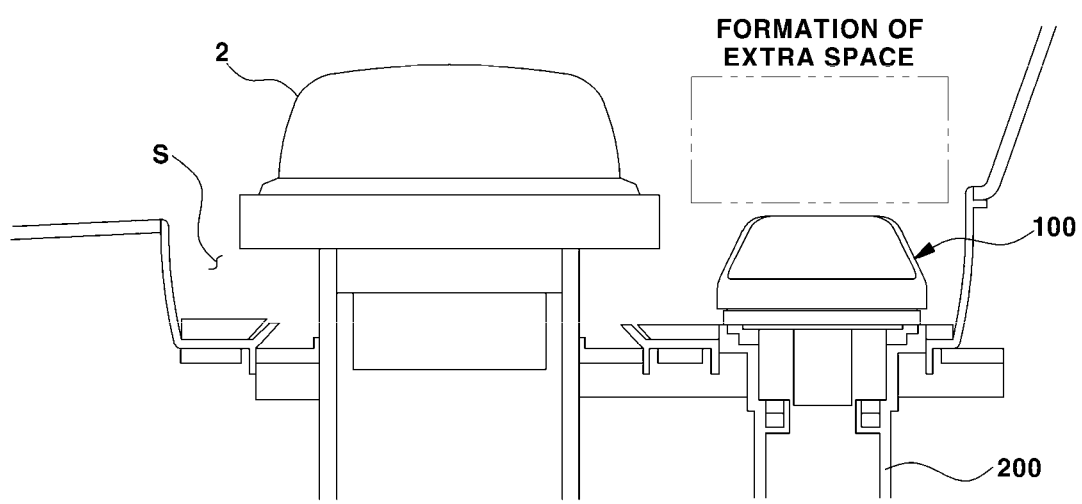
FIG. 7 is a view showing a urea cap and a fuel cap mounted in a fuel cap chamber.

FIG. 7 is a view exemplarily illustrating the urea cap and a fuel cap, which are mounted in a fuel cap chamber.

As illustrated in FIG. 7, when the urea cap 100, constructed as described above, is mounted in a fuel cap chamber S together with a fuel cap 2, an extra space is secured above the urea cap 100. Thus, when the user couples the fuel cap 2 to or removes the fuel cap 2 from the fuel inlet, the user's hand is prevented from interfering with the urea cap 100. Furthermore, since the urea cap 100 is configured to be operated in a push-and-pull manner to open and close the inlet 211, operability thereof is improved, and the user's hand is prevented from interfering with the portion of the vehicle body that surrounds the fuel cap chamber S when operating the urea cap 100.

Furthermore, the seal member 140 may prevent the occurrence of noise due to friction generated on the surface of the injection portion 210 when the inlet 211 is opened and closed by the urea cap 100.

As is apparent from the above description, since the urea cap according to an exemplary embodiment of the present invention is configured to be operated in a push-and-pull manner to open and close an inlet of a urea filler neck, operability thereof is improved, and the user's hand is prevented from interfering with a fuel cap or a portion of the vehicle body that surrounds a fuel cap chamber (i.e., the internal space of a fuel door) when operating the urea cap. That is, the urea cap may enable the user to conveniently open and close the inlet of the urea filler neck without interfering with peripheral parts, and thus may maximize convenience in opening and closing the inlet.

Furthermore, compared to a conventional urea cap, the urea cap according to an exemplary embodiment of the present invention and an inlet of a urea filler neck may be reduced in size, which leads to an increase in the area of a fuel cap chamber. As a result, the user's hand may be prevented from interfering with the urea cap when rotating a fuel cap to open and close a fuel inlet.

Furthermore, a cap body of the urea cap may be fixed to the upper portion of a urea filler neck using a magnetic-force-generating member, which is provided in the urea filler neck, without the necessity of adding a structure for fixing the cap body to the upper portion of the urea filler neck.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A device for opening and closing a urea inlet for a vehicle, the device comprising:
a urea filler neck having:
the urea inlet to allow injection of urea into a urea tank; and
a magnetic-force-generating member disposed at an inner side of the urea filler neck and spaced a predetermined distance apart from the urea inlet,
a cap body including a body cover portion configured to rest on the urea inlet and a body-fixing portion extending from the body cover portion with a diameter smaller than the body cover portion and inserted into the urea filler neck, wherein the body cover portion has a ventilation hole formed therein to allow air positioned in the urea filler neck to pass therethrough and formed outside the body-fixing portion;
a metal member mounted in the body-fixing portion and positioned between the urea inlet and the magnetic-force-generating member in a longitudinal direction of the urea filler neck when the body cover portion is seated on and in contact with the urea inlet, the metal member being magnetically coupled to the magnetic-force-generating member to fix the body-fixing portion when the body-fixing portion is inserted into the urea filler neck; and
a cap head coupled to an upper portion of the cap body, wherein the cap head includes a plurality of fixing protrusions formed on an internal surface of the cap head and formed to be spaced from each other in a circumferential direction of the cap head,
wherein the cap body has a body-coupling portion formed at the upper portion of the cap body, the body-coupling portion including a locking flange configured to be directly caught by the fixing protrusions when the body-coupling portion is inserted into the cap head, and
wherein, when the body-coupling portion is inserted into the cap head and is directly caught by the plurality of fixing protrusions, the air passes through a space formed between the plurality of fixing protrusions.

2. The device of claim 1,
wherein, when the body-fixing portion is inserted into an upper portion of the urea filler neck through the urea inlet, the metal member is mounted above the magnetic-force-generating member, and is attracted downwards by a magnetic force generated by the magnetic-force-generating member.

3. The device of claim 1,
wherein the magnetic-force-generating member is mounted in an inner circumference of the urea filler neck, and
wherein the metal member is mounted in the body-fixing portion in a circumferential direction of the body-fixing portion.

4. The device of claim 1,
wherein the body cover portion covers the urea inlet when the body-fixing portion is inserted into an upper portion of the urea filler neck.

5. The device of claim 4,
wherein the cap body further includes a seal member secured to a lower surface of the body cover portion, and
wherein, when the body-fixing portion is inserted into the upper portion of the urea filler neck, the seal member is brought into contact with an upper end portion of an injection portion of the urea filler neck in which the urea inlet is formed.

6. The device of claim 5,
wherein when the body-fixing portion is inserted into the upper portion of the urea filler neck, the seal member is pressed toward the upper end portion of the injection portion by a magnetic force of the magnetic-force-generating member attracting the metal member.

7. The device of claim 1, further including:
a cap head including a grip portion formed at an upper end portion of the cap head, wherein the grip portion is configured to be grasped by a user.

8. The device of claim 7, further including:
wherein, when the body-fixing portion is inserted into an upper portion of the urea filler neck, the grip portion is moved downwards linearly from above the urea inlet, and
wherein, when the body-fixing portion is drawn out of the upper portion of the urea filler neck, the grip portion is moved upwards linearly above the urea inlet.

9. The device of claim 1,
wherein the body cover portion is mounted with a gas permeable membrane covering the ventilation hole to allow the air to pass therethrough.

10. The device of claim 1,
wherein the body cover portion has a larger radius than a radius of the urea inlet, and
wherein the body-fixing portion has a smaller radius than the radius of the urea inlet.

11. The device of claim 1,
wherein the ventilation hole fluidically-communicates with the space formed between the plurality of fixing protrusions.

12. The device of claim 1,
wherein a urea-injecting gun being insertable into the urea filler neck such that urea is supplied into the urea filler neck has an injecting-gun magnet portion to be magnetically attracted to the magnetic-force-generating member,
when the magnetic-force-generating member and the injecting-gun magnet portion are aligned with each other, the urea-injecting gun starts to discharge the urea.

* * * * *